(12) United States Patent
Magnet et al.

(10) Patent No.: US 7,649,066 B2
(45) Date of Patent: Jan. 19, 2010

(54) METHOD OF OBTAINING BLOCK COPOLYMERS AND USES THEREOF IN ADHESIVE COMPOSITIONS

(75) Inventors: Stéphanie Magnet, Morlanne (FR); Olivier Guerret, Mazerolles (FR); Nicolas Passade Boupat, Pau (FR); Christian Laurichesse, Bernay (FR); Nour Eddine El Bounia, Orthez (FR)

(73) Assignee: Arkema France, Colombes (FR)

( * ) Notice: Subject to any disclaimer, the term of this patent is extended or adjusted under 35 U.S.C. 154(b) by 294 days.

(21) Appl. No.: 10/582,535

(22) PCT Filed: Dec. 8, 2004

(86) PCT No.: PCT/FR2004/003153

§ 371 (c)(1),
(2), (4) Date: Jun. 9, 2006

(87) PCT Pub. No.: WO2005/066232

PCT Pub. Date: Jul. 21, 2005

(65) Prior Publication Data

US 2007/0021568 A1    Jan. 25, 2007

(30) Foreign Application Priority Data

Dec. 11, 2003    (FR) .................................. 03 14505

(51) Int. Cl.
*C08F 120/18*    (2006.01)

(52) U.S. Cl. .................................... 526/329.7; 526/328
(58) Field of Classification Search ............. 526/329.7, 526/328

See application file for complete search history.

(56) References Cited

U.S. PATENT DOCUMENTS

| 6,262,206 B1 | 7/2001 | Nesvadba et al. |
| 6,657,043 B1 | 12/2003 | Guerret et al. |
| 2001/0008928 A1 | 7/2001 | Nesvadba et al. |
| 2001/0039315 A1 | 11/2001 | Nesvadba et al. |
| 2003/0124074 A1 | 7/2003 | Mougin et al. |

FOREIGN PATENT DOCUMENTS

WO    WO 2004/087796    10/2004

OTHER PUBLICATIONS

Robin et al. "Synthesis of Stars and Starlike Block Copolymers from a Trialkoxyamine Used as Initiator" 2002, Macromolecules, vol. 35, pp. 2481-2486.*

* cited by examiner

*Primary Examiner*—Kuo-Liang Peng
(74) *Attorney, Agent, or Firm*—Thomas F. Roland

(57) ABSTRACT

The present invention describes linear or star block copolymers, their process of preparation and their use in adhesive compositions, in particular as pressure-sensitive adhesive. The copolymers of the invention are prepared by controlled radical polymerization by nitroxides; they exhibit at least one soft block with a Tg of less than 0° C. and at least one hard block with a Tg of greater than ambient temperature.

12 Claims, 3 Drawing Sheets

Graph 1: Measurement of tan δ by DMA at 1 Hz between a copolymer possessing marked phase separation (□) and a copolymer possessing phases which are not well separated (Δ).

Graph 2: × blue pure model SBuAS, * black SBuAS + Reagem 5110, o red Adtac LV.

Graph 3: DMA of the copolymers of Example 1

US 7,649,066 B2

METHOD OF OBTAINING BLOCK COPOLYMERS AND USES THEREOF IN ADHESIVE COMPOSITIONS

This application claims benefit, under U.S.C. §119 or §365 of French Application Number 03/14505, filed Dec. 11, 2003; and PCT/FR2004/003153 filed Dec. 8, 2004.

FIELD OF THE INVENTION

The present invention relates to the field of formulations for adhesives, particularly to the field of formulations for hot-melt pressure-sensitive adhesives and more particularly to the field of formulations for adhesives based on block copolymers.

The present invention discloses block copolymers, their process of preparation by radical polymerization controlled by alkoxyamines, and their use in formulations for adhesives.

BACKGROUND OF THE INVENTION

Conventionally, hot-melt pressure-sensitive adhesive formulations, generally denoted by HMPSA formulations, for example used in adhesive tape and label applications, have to exhibit a compromise in properties between their use (thermal stability, level of viscosity, and the like) and their physical properties (adhesion, cohesion, resistance to temperature, and the like). Adhesive tapes using HMPSA adhesives have now been produced for more than 50 years.

HMPSA adhesive formulations are usually composed of polymers, of tackifying resins and of oil. It is by adjusting the overall formulation (nature of the ingredients and percentages) that the specifications for a given application are met. In these formulations, the use of the tackifying resin and of the oil makes it possible simultaneously to adjust the properties but also to reduce the overall cost of the formulation, the polymer generally being the most expensive compound.

According to the prior art, see, for example, Ullmann's Encyclopedia of Industrial Chemistry, 5th edition (1995), Vol. A 26, p. 659-660, HMPSAs are preferably based on SIS (styrene-isoprene-styrene) but also SBS (styrene-butadiene-styrene) block copolymers.

In these polymers with the general structure A-B-A, the A blocks are generally thermoplastic in nature with a glass transition temperature (Tg) of greater than 0° C. and preferably than 60° C. and the B blocks are elastomeric in nature with a Tg of less than 0° C., preferably than −30° C.

One of the key parameters to making a success of an HMPSA formulation is to control the compatibility between the tackifying resin and/or the oil, on the one hand, and the block copolymer, on the other hand, in order for these additives to be able to be mixed and thus to selectively modify each of the blocks. In fact, most of the existing products on the market were developed for the purpose of being able to modify either the styrene blocks or the isoprene or butadiene blocks.

Generally, HMPSA formulations comprise between 15% and 40% of polymer, the remainder being composed of tackifying resin and of plasticizer.

As mentioned in U.S. Pat. No. 5,313,041, relating to HMPSAs, SBSs and SISs exhibit the disadvantage of being unstable towards heat and towards ultraviolet (UV) radiation.

Novel ABA block copolymers have thus been developed where the B block is composed of an alkyl acrylate. The advantage of this type of monomer as elastomeric phase relates to better thermal stability and better resistance to UV radiation due to the absence of a double bond and better adhesion results due to the greater polarity.

Such copolymers are disclosed, for example, in Patent EP 0 349 270 B1. The said polymers are prepared by radical polymerization in the presence of an iniferter. It should be noted that all the examples given in this document relate to products comprising a minimum of 75% of phase B.

Given that the solubility parameters of the styrene and alkyl acrylate monomers, in particular the butyl acrylate monomers, are similar, the A-B-A block copolymers for which the A block is essentially based on polystyrene and the B block is based on poly(butyl acrylate) are particularly difficult to formulate. This is because, in order to avoid having miscibilization between the blocks and thus losing the characteristic properties of HMPSAs, it is particularly important to fully control the process for the manufacture of the copolymer so as to have the best phase separation possible. It is also particularly important to properly choose additives, such as the tackifying resins and plasticizers, participating in the formulations for the purpose of selectively modifying the A block or the B block. A hasty selection of the additives can result either in immiscibility with the A and B block or, on the contrary, in high miscibility with the B block and/or the A block which results in a loss in the phase separation and thus in a poor final result in terms of adhesive formulation.

The document JP2001288442 of Nitto Denko Corp. discloses the synthesis of A-B-A copolymers for which the A block is composed of styrene and the B block of an acrylate with a sufficiently high difference in solubility coefficient to have good phase separation during the synthesis. The radical polymerization process employed in this document is a process of ATRP (Atom Transfer Radical Polymerization) type. This technique involves the use of metal derivatives as control agents, which requires the introduction, into the process for the manufacture of the said polymer, of an additional purification stage at the end of the polymerization in order to remove the traces of metal which are present in the reaction medium. It should also be noted that this document is not associated with the formulation of the polymer in order to obtain an adhesive typical of HMPSAs.

The Applicant Company, seeking to solve all the problems described above, has found that adhesive compositions based on block copolymers with a well defined architecture and a well defined chemical structure, such as those described later, and on particularly well suited tackifying resins and on particularly well suited oil exhibit a relatively advantageous combination of the applicative properties and constitute a good solution.

DETAILED DESCRIPTION OF THE INVENTION

Figure 1:
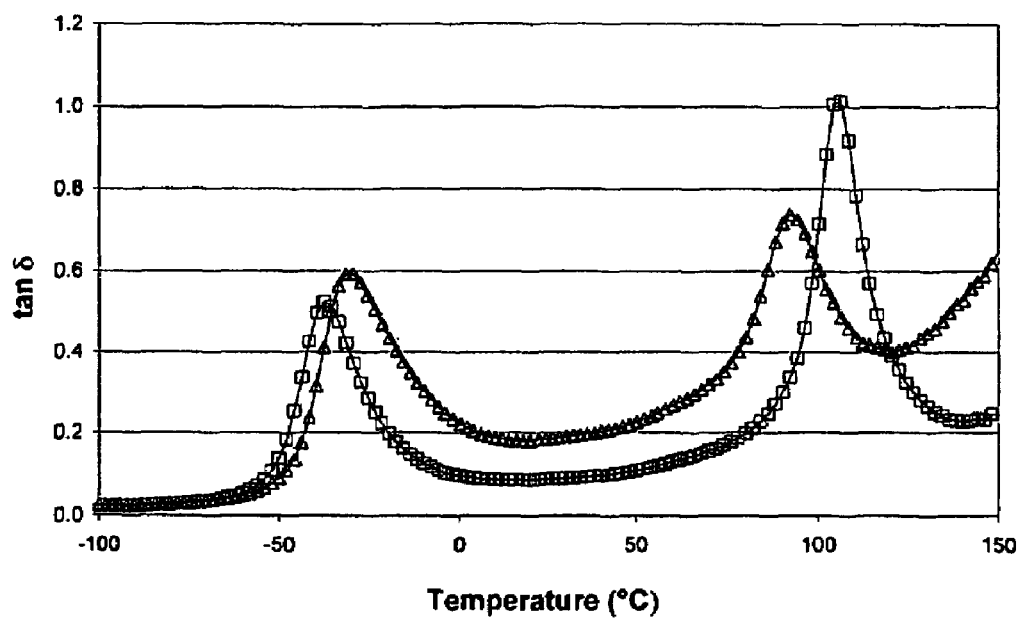
FIG. 1: Measurement of tan δ by DMA at 1 Hz between a copolymer possessing marked phase separation and a copolymer possessing phases which are not well separated.
Figure 2:
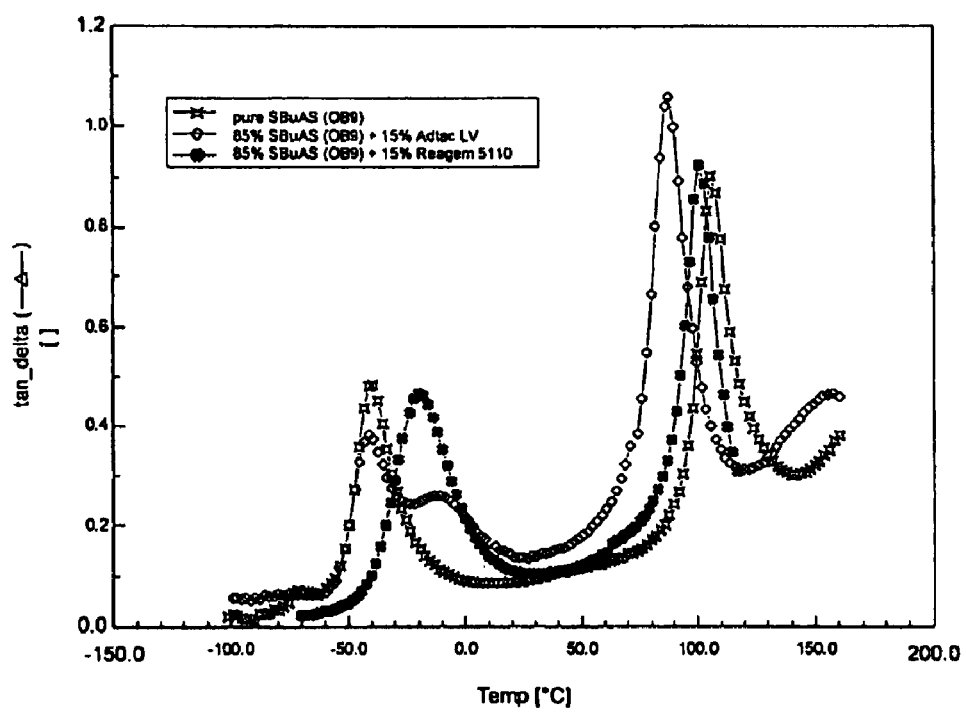
FIG. 2: Measurement of tan δ by DMA at 1 Hz for pure model SbuAS, * SBuAS+Reagem 5110, and red Adtac LV.
Figure 3:
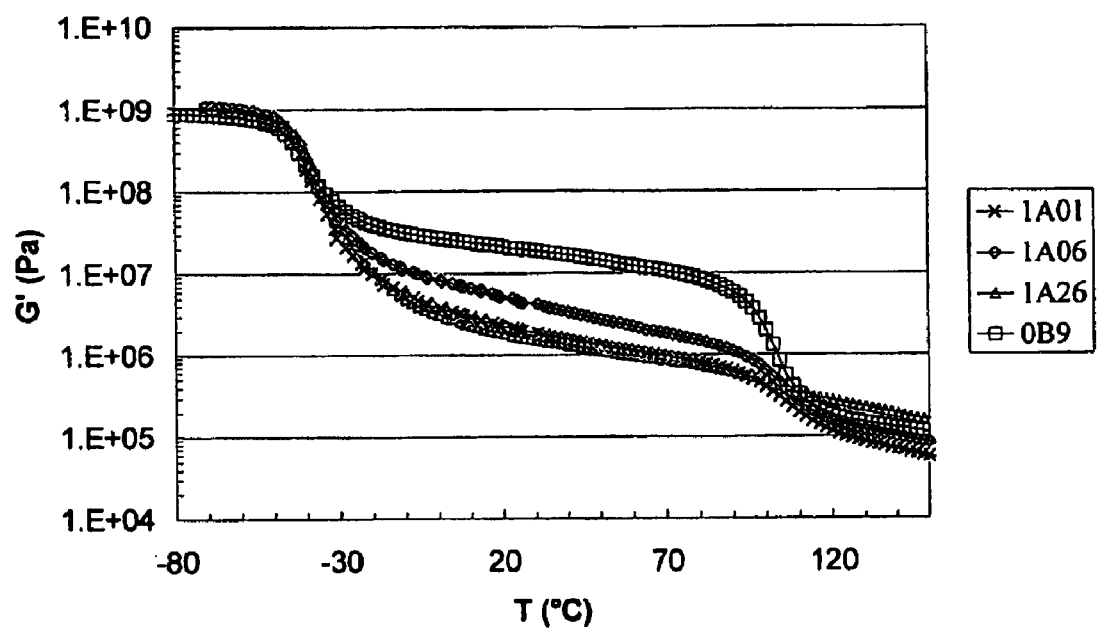
FIG. 3: DMA results of the copolymers of Example 1.

The first subject-matter of the invention is thus a block copolymer corresponding to the following general formula:

I-$(B)_n$-$(A)_m$, in which n is an integer greater than or equal to 1, m an integer less than or equal to n, B a polymer block directly bonded to the core I via a covalent bond and A a polymer block directly bonded to the B block via a covalent bond. Thus, n B blocks are attached via one of their ends to the core I and m blocks from the n B blocks are attached via their other ends to an A block.

The B block is obtained by the polymerization of a mixture of monomers ($B_0$) comprising:
- from 90 to 100% by weight of at least one monomer ($B_1$) chosen from the group consisting of linear or branched $C_1$-$C_{12}$ alkyl acrylates,
- from 0 to 10% by weight of at least one monomer ($B_2$) chosen from acids and their derivatives, such as acrylic acid, methacrylic acid and their salts. A is obtained by the polymerization of a mixture of monomers ($A_0$) comprising:
- from 95 to 100% by weight of at least one monomer ($A_1$) chosen from the group consisting of methacrylic monomers, styrene monomers and their derivatives,
- from 0 to 5% by weight of at least one monomer ($A_2$) chosen from acids and their derivatives, such as acrylic acid, methacrylic acid and their sodium or potassium salts.

The core (I) is an organic group having n, greater than or equal to 1, carbon atoms to which are attached the B blocks via one of the valences of these carbon atoms.

I corresponds to one of the following general formulae Ia, Ib and Ic:

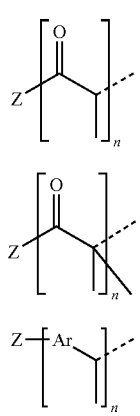

Ia, Ib and Ic result from the thermal decomposition of the corresponding alkoxyamine as described later (formulae II), where Ar denotes a substituted aromatic group and Z is a polyfunctional organic or inorganic radical with a molar mass of greater than or equal to 14. Z is associated with n functional groups of acryl type in the formula Ia, with n functional groups of methacryl type in the formula Ib and with n functional groups of styryl type in Ic. As nonlimiting examples of the scope of the invention, Z can be a polyalkoxy, in particular dialkoxy, group, such as the 1,2-ethanedioxy, 1,3-propanedioxy, 1,4-butanedioxy, 1,6-hexanedioxy or 1,3,5-tris(2-ethoxy)cyanuric acid; a polyaminoamine group, such as polyethyleneamines or 1,3,5-tris(2-ethylamino)cyanuric acid; a polythioxy group; or a phosphonate or polyphosphonate group. Z can also be an inorganic group, for example an organometallic complex such as: $M^{n+}O^-{}_n$; the second valency of the oxygen atoms corresponds to the bond which appears between Z and the acryl, methacryl and styryl groups. M can be a magnesium, calcium, aluminium, titanium, zirconium, chromium, molybdenum, tungsten, manganese, iron, cobalt, nickel, palladium, platinum, copper, silver, gold, zinc or tin atom.

According to a preferred form of the invention, $B_0$ comprises from 92 to 98% by weight of monomers $B_1$ and from 2 to 8% by weight of monomers $B_2$.

$B_2$ is preferably acrylic acid.

According to another embodiment, $A_0$ comprises from 95 to 98% by weight of monomers $A_1$ and from 2 to 5% by weight of monomers $A_2$.

$A_2$ is preferably methacrylic acid.

The presence of the monomers which are acids and/or salts of acids is essential for improving certain properties, in particular for improving the adhesion, of the adhesive compositions of the invention but also for increasing the Tg of the blocks comprising such monomers and thus increasing the difference in the solubility coefficients between the various blocks of the block copolymer.

The combined blocks B represent from 50 to 95% by weight of the total weight of the copolymer.

The B block is a polymeric block with an elastomeric nature, that is to say exhibiting a glass transition temperature (Tg) of less than ambient temperature and preferably of less than −30° C.; furthermore, the B block has a weight-average mass of between 2000 and 300 000 g/mol, preferably of between 10 000 and 200 000, and a polydispersity index of between 1 and 3.

The A block is a polymeric block with a thermoplastic nature, that is to say having a Tg of greater than ambient temperature and preferably of greater than 90° C.

The weight-average molecular mass (Mw) of the block copolymer $(A)_m$-$(B)_n$-I is between 80 000 g/mol and 300 000 g/mol.

The copolymer of the invention can be prepared according to the controlled radical polymerization process described later. It is a known process; however, given the elastomeric nature of the copolymer, it is still very difficult, even impossible, to recover it, at the end of the preparation cycle, in a form suitable for subsequent use. To solve this problem, the Applicant Company has optimized the process of synthesis by incorporating, in the preparation line, a device of "mixer-dryer" type; this device, well known in anionic polymerization techniques, has never been proposed or suggested for use in a process such as that of the present invention because of certain preconceptions, in particular the preconception according to which a "mixer-dryer" must not or in any case cannot be used for treating products with a strong elastomeric nature and with a high viscosity, the latter being due both to the low level of volatiles at the end of the cycle but also to the composition and to the architecture of the block copolymer according to the invention.

The preparation process thus consists in initiating the polymerization of the monomer or monomers necessary for the B block by an initiator of alkoxyamine type, optionally mixed with a nitroxide. The choice of the initiators of the invention is essential for the success of the manufacture of the material: this is because these initiators make it possible to control the number of arms of the block copolymer and the satisfactory sequencing thereof. The latter characteristic depends on the choice of the nitroxide control agent produced by the decomposition of the initiating alkoxyamines. The general formulae of the alkoxyamine initiators chosen according to the invention are therefore as follows:

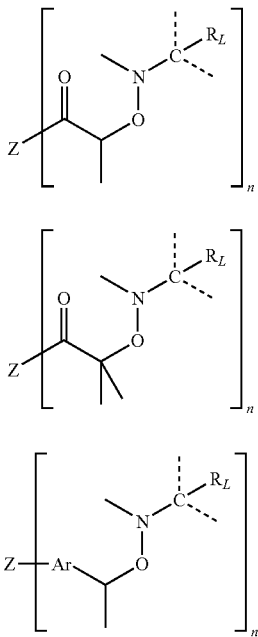

in which:

Z has the same meaning as above and the carbon atom in the alpha position with respect to the NO bond carries at least one organic group $R_L$ with a molecular mass of greater than or equal to 14 g/mol. The other valences of the nitrogen or of the carbon in the alpha position carry organic groups, such as linear or branched alkyl groups, such as tert-butyl or isopropyl, which are optionally substituted, such as 1,1-dimethyl-2-hydroxyethyl, hydrogen atoms or aromatic rings, such as the optionally substituted phenyl group.

The radical $R_L$ has a molar mass of greater than 14 which can comprise a phosphoryl group and/or an aromatic ring.

Generally, the alkoxyamines according to the invention are those disclosed in Patent Application EP 1 178 955.

The preferred alkoxyamines of the invention are those corresponding to the following formulae:

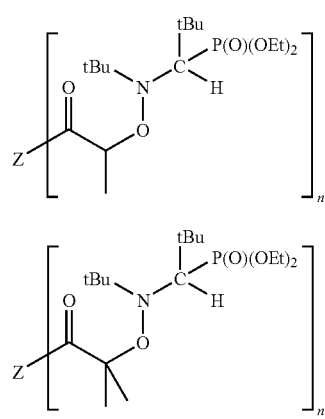

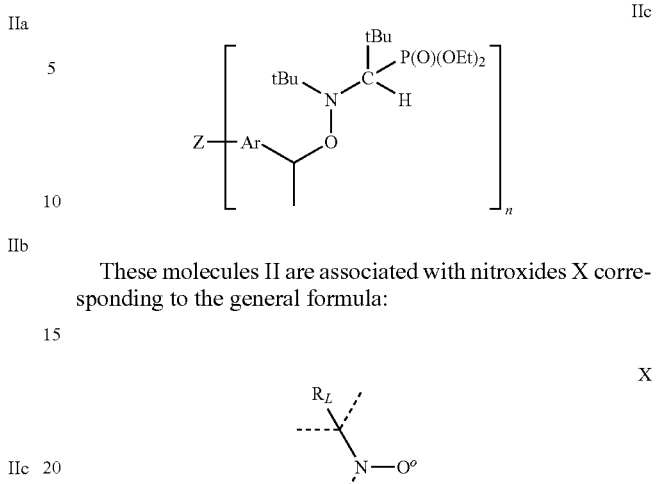

These molecules II are associated with nitroxides X corresponding to the general formula:

X $R_L$ and the groups attached to the nitrogen atom and to the carbon atom in the alpha position with respect to the nitrogen have the same meanings as above.

The choice of n integer greater than or equal to 1 makes it possible in particular to provide a very high level of block copolymers in the final material, the presence of unreacted B block after the formation of A being limited.

The choice of $R_L$ is particularly important so as to provide, during the formation of B, good control of the polymerization which makes it possible to maintain a high reactivity of B during the reinitiation of A. Preferably, mention will be made of the following two nitroxides X1 and X2:

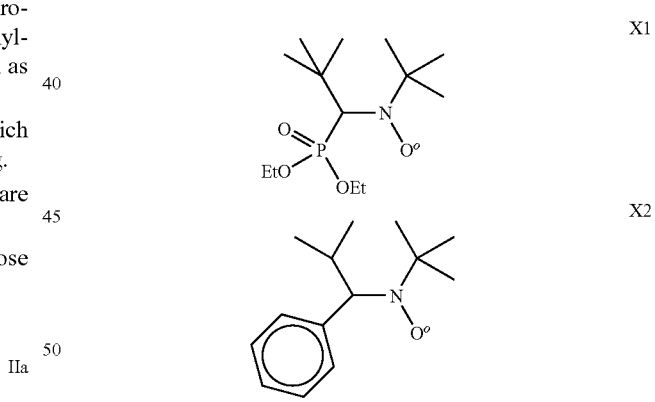

X1 is denoted below by SG1.

The manufacturing process thus consists in first polymerizing the B block in the presence of an initiator of formula II and optionally of an additional amount of compound X at a temperature of between 60° C. and 150° C., preferably between 80 and 120° C., under a pressure ranging from 1 to 10 bars, preferably of between 1.5 and 5 bar. The polymerization can be carried out in the presence or absence of a solvent or in a dispersed medium. The polymerization is halted before 90% conversion. The choice is made to evaporate or not to evaporate the residual monomer of the B block according to the facility related to the process of synthesis. The amount of monomer for A block is then added. The polymerization of the A block is carried out under conditions similar to those of the B block. The polymerization of the A block is continued to the targeted conversion. The product is recovered after devolatilization of the residual monomers and/or the residual solvent in a recovery device of mixer-dryer type at pressures of less than 60 mbar, at product temperatures of greater than 150° C. and at mixer outlet flow rates ranging from 1 to 15 kg/h. Under the optimum temperature, pressure and flow rate conditions, the dry polymers exhibit levels of residual volatiles of less than 1000 ppm.

The copolymers of the invention as described above are of use in adhesive formulations, in particular pressure-sensitive adhesive formulations.

One of the subject-matters of the invention is an adhesive composition comprising:
  from 15 to 50% by weight of the total weight of the composition of at least one block copolymer as described above,
  from 35 to 50% by weight of the total weight of the composition of at least one tackifying resin,
  from 10 to 30% by weight of the total weight of the composition of at least one plasticizer.

The adhesive composition according to the invention can be obtained by blending the various compounds and optionally additives by any suitable means, for example by simple mixing at a temperature of between 150° C. and 170° C. in a melter.

According to the invention, the oils to be used are preferably oils of trimellitate type, such as trioctyl trimellitate, or alternatively predominantly naphthenic oils, such as Catenex N956 from Shell. It is inadvisable to use oils of paraffinic type (typically Primol 352 from Exxon-Mobil) or of liquid polybutene type (typically Napvis 10) as, under certain conditions, they are incompatible with the copolymer and exude from the binary blend.

According to the invention, the tackifying resins to be used are resins based on rosins, such as Foral AX resins, or on rosin ester, such as Foral F85, resins known under the pure monomer name, such as Krystallex F85, polyterpene resins, such as Dercolyte A 115 from DRT, hydroxylated polyester resins (typically Reagem 5110 from DRT), terpene styrene resins (typically Dercolyte TS 105 from DRT), pentaerythritol terpene resins (typically Dertoline P2L) or resins based on terpene phenol (typically Dertophene T105 from DRT).

The composition of the invention can be used as pressure-sensitive or pressure-insensitive adhesive in the fields of hygiene, wood, binding, packaging, tapes and labels, and in mastics.

The following examples illustrate the invention without limiting the scope thereof.

Examples of copolymer grades obtained by the claimed process are presented in the following table:

| | Nature of the alkoxyamine | Structure of the copolymer | Composition by weight of the B/A copolymer | Mn of the copolymer |
|---|---|---|---|---|
| OB9 | IIb, n = 2 | A-B-A<br>B = p(BuA)<br>A = p(S) | 62/38 | 158 600 |
| 1A26 | IIc, n = 3 | A-B-AA<br>B = p(BuA-r-AA)<br>A = p(S) | 73/27 | 90 700 |
| 1A01 | IIb, n = 2 | A-B-A<br>B = p(BuA)<br>A = p(S) | 70/30 | 97 850 |
| 1A06 | IIb, n = 2 | A-B-A<br>B = p(BuA)<br>A = p(S) | 68/32 | 99 780 |
| 2A13 | IIb, n = 2 | A-B-A<br>B = p(BuA)<br>A = p(S-r-AA) | 66/44 | 69 580 |
| 2A25 | IIb, n = 2 | A-B-A<br>B = p(BuA)<br>A = p(S-r-MAA) | 76/24 | 56 490 |
| 2A08 | IIb, n = 2 | A-B-A<br>B = p(BuA-r-AA)<br>A = p(S) | 64/36 | 96 240 |
| 2A09 | IIb, n = 2 | A-B-A<br>B = p(BuA-r-AA)<br>A = p(S) | 59/41 | 55 100 | p(BuA) poly(Butyl Acrylate),
p(S) poly(Styrene)
p(BuA-r-AA) poly(Butyl Acrylate-random-Acrylic Acid)
p(S-r-MAA) poly(Styrene-random-Methacrylic Acid)

EXAMPLES

1. Process for the Preparation of OB9: Synthesis and Recovery of the BUA/S Linear Block Copolymer: the Synthesis of the Thermoplastic Block is Carried Out Under Bulk Conditions 118 kg of butyl acrylate are introduced at 40° C. into a 500 l reactor equipped with a jacket (aqueous glycol solution) and are heated. At 80° C., 463 g of a 50% solution of alkoxyamine IIb in ethylbenzene and 125 g of a 10% solution of nitroxide SG1, corresponding to the formula X1, in ethylbenzene are introduced. The temperature is subsequently maintained at 114° C. for 4.5 hours until a degree of conversion of butyl acrylate of 50% is achieved. The residual monomer is then removed at 75° C. under 200-300 mbar. After devolatilization and returning to 60° C., 100 kg of styrene are introduced into the reactor. The temperature is then adjusted to 110° C. and controlled for 2 hours until 25% of the monomers have been polymerized. Once the desired conversion is achieved, a solution of inhibitor (OH-Tempo) is added to the reaction medium at 114° C. and the reactor is subsequently cooled to 60° C. The solution is then transferred into a 270 l storage tank via a gear pump. The mixer-dryer is fed continuously via a gear pump from the storage tank through transfer lines heated to 60° C. so as to avoid any problem of fouling due to the high viscosity of the polymeric solutions at low temperature. The optimum operating conditions for use of the mixer-dryer are an outlet flow rate of 5 to 10 kg/hour and a temperature of 180° C. under a pressure of 10 mbar abs. The dried polymer is then recovered in the form of laces which are cooled in a cold bath before being granulated.

2. Process for the Manufacture of 1A26: Synthesis and Recovery of the BUA/S Star Block Copolymer: the Synthesis of the Thermoplastic Block is Carried Out Under Bulk Conditions.

153 kg of butyl acrylate are introduced at 40° C. into a 500 l reactor equipped with a jacket (aqueous glycol solution) and are heated. At 80° C., 902 g of a 50% solution of alkoxyamine IIc in ethylbenzene and 150 g of a 10% solution of nitroxide SG1 in ethylbenzene are introduced. The temperature is subsequently maintained at 114° C. for 3.5 hours until a degree of conversion of butyl acrylate of 45% is achieved. The residual monomer is then removed at 75° C. under 200-300 mbar. After devolatilization and returning to 60° C., 120 kg of styrene are introduced into the reactor. The temperature is then adjusted to 110° C. and controlled for 1 hour until 25% of the monomers have been polymerized. Once the desired conversion is achieved, a solution of inhibitor (OH-Tempo) is added to the reaction medium at 114° C. and the reactor is subsequently cooled to 60° C. The solution is then transferred into a 270 l storage tank via a gear pump. The recovery of the copolymer in the dried form (granules) is carried out in an equivalent way to that described in the example of the preparation of OB9.

3 and 4. Process for the Manufacture of 1A01 and 1A06: Synthesis and Recovery of BuA/S Linear Block Copolymers: the Synthesis of the Thermoplastic Block is Carried Out Under Bulk Conditions.

149 kg of butyl acrylate are introduced at 40° C. into a 500 l reactor equipped with a jacket (aqueous glycol solution) and are heated. At 80° C., 760 g of a 50% solution of alkoxyamine IIb in ethylbenzene and 206 g of a 10% solution of nitroxide SG1 in ethylbenzene are introduced. The temperature is subsequently maintained at 114° C. for 4.5 hours until a degree of conversion of butyl acrylate of 50% is achieved. The residual monomer is then removed at 75° C. under 200-300 mbar. After devolatilization and returning to 60° C., 120 kg of styrene are introduced into the reactor. The temperature is then adjusted to 110° C. and controlled for 2 hours until 25% of the monomers have been polymerized. Once the desired conversion is achieved, a solution of inhibitor (OH-Tempo) is added to the reaction medium at 114° C. and the reactor is subsequently cooled to 60° C. The solution is then transferred into a 270 l storage tank via a gear pump. The recovery of the copolymer in the dried form (granules) is carried out in an equivalent way to that described in the example of the preparation of OB9.

5. Process for the Manufacture of 2A13: Synthesis and Recovery of BuA/S-AA Linear Block Copolymers: the Synthesis of the Thermoplastic Block is Carried Out Under Bulk Conditions.

150 kg of butyl acrylate are introduced at 40° C. into a 500 l reactor equipped with a jacket (aqueous glycol solution) and are heated. At 80° C., 766 g of a 50% solution of alkoxyamine IIb in ethylbenzene and 206 g of a 10% solution of nitroxide SG1 in ethylbenzene are introduced. The temperature is subsequently maintained at 114° C. for 4.5 hours until a degree of conversion of butyl acrylate of 50% is achieved. The residual monomer is then removed at 75° C. under 200-300 mbar. After devolatilization and returning to 60° C., 125 kg of styrene and 3 kg of acrylic acid are introduced into the reactor. The temperature is then adjusted to 110° C. and controlled for 1.5 hours until 25% of the monomers have been polymerized. Once the desired conversion is achieved, a solution of inhibitor (OH-Tempo) is added to the reaction medium at 114° C. and the reactor is subsequently cooled to 60° C. The solution is then transferred into a 270 l storage tank via a gear pump. The recovery of the copolymer in the dried form (granules) is carried out in an equivalent way to that described in the example of the preparation of OB9.

6. Process for the Manufacture of 2A25: Synthesis and Recovery of BuA/S-MAA Linear Block Copolymers: the Synthesis of a Thermoplastic Block is Carried Out Under Solvent Conditions.

189 kg of butyl acrylate are introduced at 40° C. into a 500 l reactor equipped with a jacket (aqueous glycol solution) and are heated. At 80° C., 870 g of a 50% solution of alkoxyamine IIb in ethylbenzene and 208 g of a 10% solution of nitroxide SG1 in ethylbenzene are introduced. The temperature is subsequently maintained at 114° C. for 4.5 hours until a degree of conversion of butyl acrylate of 45% is achieved. The residual monomer is then removed at 75° C. under 200-300 mbar. After devolatilization and returning to 60° C., 47 kg of styrene, 5 kg of methacrylic acid and 94 kg of ethylbenzene are introduced into the reactor. The temperature is then adjusted to 120° C. and controlled for 2.0 hours until 50% of the monomers have been polymerized. Once the desired conversion is achieved, a solution of inhibitor (OH-Tempo) is added to the reaction medium at 114° C. and the reactor is subsequently cooled to 60° C. The solution is then transferred into a 270 l storage tank via a gear pump. The recovery of the copolymer in the dried form (laces) is carried out in an equivalent way to that described in the example of the preparation of OB9.

7 and 8. Process for the Manufacture of 2A08 and 2A09: Synthesis and Recovery of BuA-AA/S Copolymers: the Synthesis of the Thermoplastic Block is Carried Out Under Bulk Conditions.

147 kg of butyl acrylate and 3 kg of acrylic acid are introduced at 40° C. into a 500 l reactor equipped with a jacket (aqueous glycol solution) and are heated. At 80° C., 766 g of a 50% solution of alkoxyamine IIb in ethylbenzene and 206 g of a 10% solution of nitroxide SG1 in ethylbenzene are introduced. The temperature is subsequently maintained at 114° C. for 4.5 hours until a degree of conversion of butyl acrylate of 50% is achieved. The residual monomer is then removed at 75° C. under 200-300 mbar. After devolatilization and returning to 60° C., 128 kg of styrene are introduced into the reactor. The temperature is then adjusted to 110° C. and controlled for 2 hours until 25% of the monomers have been polymerized. Once the desired conversion is achieved, a solution of inhibitor (OH-Tempo) is added to the reaction medium at 114° C. and the reactor is subsequently cooled to 60° C. The solution is then transferred into a 270 l storage tank via a gear pump. The recovery of the copolymer in the dried form (granules) is carried out in an equivalent way to that described in the example of the preparation of OB9.

II. Test Methods

Polymer/(Resin or Oil) Compatibility

In order to evaluate the compatibility between the oil or the resin and the polymer, a binary blend between the resin (or the oil) to be characterized and a reference S-BuA-S copolymer OB9 is prepared by the molten route at 150° C.

For the resins which are solid at ambient temperature, the blend comprises 35% by weight of copolymer.

For the resins which are liquid at ambient temperature, the blend comprises 69% by weight of copolymer.

For the oils, the blend comprises 85% by weight of copolymer.

This blend is subsequently characterized by the measurements of the viscoelastic properties (G', G", tan δ) as a function of the temperature at the stressing frequency of 1 Hz.

The glass transition temperatures (Tg) of the BuA and styrene phases of the blend are found.

In the event of complete or partial noncompatibility of the oil or the resin with the polymer, the glass transition temperature of this compound may be observed.

In the event of compatibility of the oil or the resin with the polymer, the glass transition temperatures of the BuA phase and of the Styrene phase are shifted with respect to the glass transition temperatures of the pure BuA and Styrene phases.

This is because the Tg corresponds to the temperature at which the appearance of molecular movement is observed: this temperature is dependent on the composition of the product.

The proportion of resin in each of the blocks can be estimated by the following relationships:

$$\frac{w_{soft}}{Tg_{soft}} = \frac{w_{ressoft}}{Tg_{res}} + \frac{w_{BuA}}{Tg_{BuA}}$$

with $$w_{soft} = w_{ressoft} + w_{BuA}$$

$$\frac{w_{hard}}{Tg_{hard}} = \frac{w_{reshard}}{Tg_{res}} + \frac{w_{PS}}{Tg_{PS}}$$

with $$w_{hard} = w_{reshard} + w_{PS}$$

and $$w_{ressoft} + w_{reshard} + w_{PS} + w_{BuA} = 1$$

where:
- $w_{res}$ is the total fraction by weight of resin (or of oil) in the binary blend,
- $w_{PS}$ is the fraction by weight of the polystyrene block in the binary blend (i.e. 85%×the fraction by weight of polystyrene block in the polymer selected −35%),
- $w_{BuA}$ is the fraction by weight of the poly(butyl acrylate) block in the binary blend (i.e. 85%×the fraction by weight of poly(butyl acrylate) block in the polymer selected −65%),
- $w_{res\ soft}$ is the fraction by weight of resin incorporated in the phase of low Tg (less than 20° C.),
- $w_{res\ hard}$ is the fraction by weight of resin incorporated in the phase of high Tg (greater than 20° C.),
- $Tg_{res}$ is the glass transition temperature of the resin measured at the stressing frequency of 1 Hz,
- $Tg_{PS}$ is the glass transition temperature of the polystyrene block measured at the stressing frequency of 1 Hz on the pure model copolymer,
- $Tg_{BuA}$ is the glass transition temperature of the poly(butyl acrylate) block measured at the stressing frequency of 1 Hz on the pure model copolymer,
- $Tg_{hard}$ is the glass transition temperature in the phase of high Tg (greater than 20° C.) measured at the stressing frequency of 1 Hz on the binary blend,
- $Tg_{soft}$ is the glass transition temperature in the phase of low Tg (less than 20° C.) measured at the stressing frequency of 1 Hz on the binary blend.

SAFT/PAFT

The SAFT (or PAFT) test measures the ability of a hot-melt adhesive to withstand a static force of 500 g (or 100 g) in shearing (or in peeling) under the effect of a steady rise in temperature of 0.4° C./min.

The SAFT is defined by the temperature at which separation by parallel vertical slippage of an area of 25×25 mm² coated with HMPSA of a flat stainless steel sheet may be observed.

The HMPSA is coated at between 140° C. and 180° C. on a PET (polyethylene terephthalate) tape with an area of 25×400 mm². As the thickness is constant, the weight per unit area is between 22 and 32 g/m². The test tapes have to be conditioned for at least four hours before the test in a climate-controlled chamber at 23±2° C. and 50±5% relative humidity. The self-adhesive tape is applied using a conventional roller of 2 kg.

The result of the SAFT is given in ° C. The type of failure must be mentioned.

Loop Tack

The loop tack test is the FINAT FTM 9 test described in the FINAT technical manual, Laan Copes Van Cattenbubsh 79, NL 2585 EW LA HAYE (1995) (HMPSA).

This test characterizes the instantaneous adhesion or tack. The tack is defined as being the force required to detach a PET loop coated with HMPSA, a predetermined surface area of which has been brought into contact with a stainless steel sheet.

The HMPSA is coated at between 140° C. and 180° C. on a PET tape with an area of 25×400 mm². As the thickness is constant, the weight per unit area is between 22 and 32 g/m². The test tapes have to be conditioned for at least four hours before the test in a climate-controlled chamber at 23±2° C. and 50±5% relative humidity. The self-adhesive tape is applied using a conventional roller of 2 kg.

The test is carried out using a dynamometer at a pull rate of 300 mm/min in a climate-controlled chamber at 23±2° C. and 50±5% relative humidity.

The loop tack is quantified by the maximum force value. The result of the test of measurement of the loop tack is given in N/25 mm. The type of failure must also be mentioned. The various types of failure are defined as follows:

Adhesive failure: The HMPSA does not adhere to either of the two substrates.

Cohesive failure: Failure in the adhesive joint is observed. In this case, the two adhesive-coated substrates carry away a portion of the joint during tensile testing.

Mixed failure: Failure is inconclusive and both types of failure described above may be observed on the same test specimen.

Creep Resistance

The creep resistance is determined by the FTM8 test (FINAT manual already mentioned). This test measures the ability of an HMPSA to withstand a static force of 1 kgf at a given temperature (at ambient temperature in the examples given).

The resistance to static shearing is defined by the time necessary to separate, by parallel vertical slippage, an area of 25×25 mm² coated with HMPSA of a flat stainless steel sheet.

The HMPSA is coated at between 140° C. and 180° C. on a PET tape with an area of 25×400 mm². As the thickness is constant, the weight per unit area is between 22 and 32 g/m². The test tapes have to be conditioned for at least four hours before the test in a climate-controlled chamber at 23±2° C. and 50±5% relative humidity. The self-adhesive tape is applied using a conventional roller of 2 kg.

The result of the creep test is given in minutes. The type of failure must also be mentioned.

180° Peeling

The adhesion to steel is determined by the FTM1 test (FINAT manual already mentioned). This test quantifies the adhesiveness. The latter is defined as being the force required to remove a PET tape coated with HMPSA from a stainless steel sheet.

The HMPSA is coated at between 140° C. and 180° C. on a PET tape with an area of 25×400 mm². As the thickness is constant, the weight per unit area is between 22 and 32 g/m². The test tapes have to be conditioned for at least four hours before the test in a climate-controlled chamber at 23±2° C.

and 50±5% relative humidity. The self-adhesive tape is applied using a conventional roller of 2 kg.

The adhesive force is measured 20 minutes after application and 24 hours after application. The test is carried out using a tensile testing device, under a peel angle of 180°, at a rate of 300 mm/min, in a climate-controlled chamber at 23±2° C. and 50±5% relative humidity.

The result of the peel test is given in N/25 mm. The type of failure must be mentioned, as described for the loop tack test.

The conditions for the synthesis of the copolymer are very important in obtaining separation between the polystyrene blocks and the central poly(butyl acrylate) block: this structuring of the material is one of the essential bases of the good performance and of the possibility of formulating the copolymer in a controlled way for the purpose of producing an HMPSA.

Graph 1 shows the change in tangent delta, which is the ratio of the viscous modulus to the elastic modulus, as measured in viscoelasticity, with the temperature. The glass transition temperatures of each block correspond to the maxima of the tan δ peaks. It is easy to see that the product for which the synthetic conditions are optimized in the way described above exhibits a much better phase separation than a product with a similar chemical nature for which the synthetic conditions are not optimized. The optimization of the synthetic conditions is reflected by a greater difference between the glass transition temperatures of the two blocks and a lower tan delta level within the temperature range between these transitions.

The preparation of binary blends with different types of oil made it possible to demonstrate that, so as to formulate the copolymers in order to obtain HMPSAs, it is advisable advantageously to use oils of trimellitate or predominantly naphthenic type.

The preparation of binary blends with different types of resins has made it possible to demonstrate that, so as to formulate the copolymers in order to obtain the HMPSAs, it is advisable advantageously to use resins based on rosins or on rosin ester, polyterpene, hydroxylated polyester, terpene styrene, pentaerythritol ester of resin, or terpene phenolic resin.

The DMA measurement of the pure model copolymer, of a resin suitable for the formulation of this copolymer (for example, in this instance, Reagem 5110) and of a resin unsuitable for the formulation of this polymer (for example, in this instance, Adtac LV) are represented in Graph 2.

For a person skilled in the art, it is clear, with regard to this measurement, that Adtac LV is weakly miscible with the copolymer (appearance of a peak at approximately −11° C.) and that the miscible part of this resin is more compatible with the styrene blocks (significant shift in the high temperature Tg) than with the butyl acrylate part (small shift with the temperature). In contrast, the resin Reagem 5110 is fully miscible with the copolymer (no appearance of a third peak) and is more miscible with the butyl acrylate part (significant shift in the low Tg) than with the polystyrene blocks (small shift in the high Tg).

From this choice of component, it is possible to formulate HMPSA adhesives.

Example 9

HMPSA formulations were prepared from the copolymers with the properties given in Table 1.

The copolymer 1A26 has the distinguishing feature of having a star central acrylate block.

The DMAs of these three copolymers are presented in Graph 3.

The blends are prepared with Foral AX resin and TOTM oil.

The first figure indicates the percentage of polymer in the formulation.

The figures between brackets indicate the proportion of resin and of oil in the remainder.

The blends are prepared at approximately 180° C. with mechanical stirring of turbine type.

The results of the adhesion tests carried out on these products are given in Table 2.

This type of formulation makes it possible to obtain highly tackifying HMPSAs.

Example 10

Blends were prepared from the polymers described above in Table 1 by replacing the resin Foral AX, suitable for the copolymers, by a resin Norsolene W90, unsuitable for the formulation of these copolymers.

The results of the adhesion tests are combined in Table 3. The properties of these blends are manifestly inadequate: they cannot be regarded as satisfactory HMPSAs.

Example 11

For these formulations, the resin Foral AX was replaced by the resin Dercolyte A115. The results of the adhesion tests are combined in Table 4.

This type of formulation makes it possible to have adhesives having a higher peel strength and a higher SAFT at the expense of the loop tack. These formulations additionally exhibit the advantage of having a very good instantaneous peel.

Example 12

Formulations in which the styrene blocks of the copolymer are functionalized were prepared by copolymerizing either acrylic acid or methacrylic acid with the styrene. The data on these copolymers are combined in Table 5.

These polymers were formulated using oils, either TOTM or Catenex N956, and resins, i.e. Foral AX.

The results of the adhesion tests are combined in Table 6. This type of formulation makes it possible to obtain products with high loop tacks while having high peel strengths.

Example 13

With regard to the copolymers which are described in Table 7, the HMPSA formulations which can be obtained using a plasticizer suitable for the formulation of such copolymers, such as TOTM or Catenex N956, or a plasticizer unsuitable for the formulation of these products, such as the oil Primol 352, are compared.

These results clearly show that, while it is possible to obtain very good HMPSAs with the copolymers claimed in the invention, it is advisable to take care to scrupulously select the components of the formulation.

TABLE 1

| Reference | A block | % A block | B block | Total Mw | Mw/Mn |
|---|---|---|---|---|---|
| OB9 | P(BuA) | 62 | P(S) | 329 600 | 2.1 |
| 1A01 | P(BuA) | 70 | P(S) | 219 800 | 1.98 |
| 1A06 | P(BuA) | 68 | P(S) | 221 540 | 2.35 |
| 1A26 | P(BuA) | 73 | P(S) | 283 630 | 2.3 |

TABLE 2

|  | Standard adhesive | 1A26 FORAL AXE 20-(70-30) | 1A26 FORAL AXE 30-(70-30) | 1A01 FORAL AXE 20-(70-30) | 1A01 FORAL AXE 30-(70-30) | 1A06 FORAL AXE 20-(70-30) | 1A06 FORAL AXE 30-(70-30) | OB09 FORAL AXE 20-(70-30) | OB09 FORAL AXE 30-(70-30) |
|---|---|---|---|---|---|---|---|---|---|
| Mean weight per unit area in g/m² | 30.00 13.00 | 25.60 1.45 | 24.50 1.89 | 24.95 2.00 | 25.20 1.79 | 24.64 1.84 | 24.95 2.00 | 25 1.93 | 24 2 |
| SAFT, stainless steel, in °C | 53 1.8 | 52 1.8 | 57 0.0 | 47 0.6 | 55 1.2 | 46 0.0 | 55 0.0 | 43 1.9 | 59 0.6 |
| Creep, stainless steel, in min | 10 000 | 88 | 403 | 260 | 298 | 226 | 588 | 162 | 329 |
| 180° Peel, 20 min, in N/25 mm | 0.40 0.00 | 9.95 0.91 | 10.53 0.74 | 16.77 1.37 | 16.33 3.63 | 16.43 1.50 | 15.07 0.64 | 13.47 0.76 | 15.87 1.36 |
| Type of failure | stick slip | cohesive | cohesive | mixed cohesive adhesive | adhesive | cohesive | adhesive | cohesive | cohesive |
| 180° Peel, 24 h, in N/25 mm | 26.85 1.25 | 4.77 0.15 | 8.60 0.85 | 9.35 0.92 | 15.90 1.84 | 10.40 1.56 | 14.40 0.42 | 7.55 0.07 | 17.70 0.28 |
| Type of failure | cohesive | cohesive | cohesive | adhesive | adhesive | adhesive | adhesive | adhesive | adhesive |
| Loop tack in N/25 mm | 6.42 1.25 | 22.81 4.89 | 14.40 1.91 | 26.25 3.68 | 19.70 2.82 | 30.30 1.04 | 19.88 1.35 | 26.67 0.06 | 24.60 1.74 |
| Viscosity, T = 0, in mPa·s at 163° C. | 2100 | 525 | 1920 | 375 | 1220 | 475 | 1300 | 820 | 6500 |

TABLE 3

|  | HV 252101 UN | 1A26 NORSOLENE W90 20-70-30 | 1A26 NORSOLENE W90 30-70-30 | 1A01 NORSOLENE W90 20-70-30 | 1A01 NORSOLENE W90 30-70-30 | 1A06 NORSOLENE W90 20-70-30 | 1A06 NORSOLENE W90 30-70-30 | OB09 NORSOLENE W90 30-70-30 |
|---|---|---|---|---|---|---|---|---|
| Mean weight per unit area in g/m² | 30.00 13.00 | | 25.86 1.45 | 23.91 0.153 | 23.50 1.46 | 24.98 1.58 | 26.10 1.59 | 26 1 |
| SAFT, stainless steel, in °C | 53 1.8 | | 50 0.6 | 42 0.6 | 46 1 | 46 0.0 | 50 0.0 | 53 2.3 |
| Creep, stainless steel, in min | 10 000 | | 565 | 240 | 1043 | 256 | 929 | 15 258 |
| 180° Peel, 20 min, in N/25 mm | 0.40 0.00 | | 1.50 0.20 | 1.00 0.00 | 0.83 0.06 | 0.27 0.25 | 0.50 0.12 | 0.40 0.10 |
| Type of failure | stick slip | | stick slip | stick slip | stick slip | stick slip | stick slip | stick slip |
| 180° Peel, 24 h, in N/25 mm | 26.85 1.25 | | 1.10 0.42 | 1.00 0.14 | 0.80 0.00 | 0.50 0.14 | 0.85 0.07 | 0.60 0.28 |
| Type of failure | cohesive | | stick slip | stick slip | stick slip | stick slip | stick slip | |
| Loop Tack in N/25 mm | 6.42 1.25 | | 3.23 1.50 | 2.88 0.70 | 3.53 1.08 | 4.20 2.93 | 2.40 1.04 | 2.28 1.02 |
| Viscosity, T = 0, in mPa·s at 163° C. | 2100 | | 3500 | 1100 | 3000 | 1050 | 2500 | 16 250 |

TABLE 4

|  | HV 252101 UN | 1A26 DERCOLYTE A115 20-70-30 | 1A26 DERCOLYTE A115 30-70-30 | 1A01 DERCOLYTE A115 20-70-30 | 1A01 DERCOLYTE A115 30-70-30 | 1A06 DERCOLYTE A115 20-70-30 | 1A06 DERCOLYTE A115 30-70-30 |
|---|---|---|---|---|---|---|---|
| Mean weight per unit area in g/m² | 30.00 13.00 | 25 1.30 | 24.11 | 25.01 2.00 | 24.80 1.80 | 26.71 0.79 | 24.56 1.57 |
| SAFT, stainless steel, in °C | 63 1.8 | 55 1.73 | 66 0.50 | 61 0.6 | 69 1.4 | 57 1.4 | 68 1.2 |
| Creep, stainless steel, in min | 10 000 | 2151 | 10 000 | 10 000 | 10 000 | 2255 | 10 000 |
| 180° Peel, 20 min, in N/25 mm | 0.40 0.0 | 7.83 3.89 | 0.67 0.25 | 6.13 1.9 | 20.63 6.4 | 0.13 0.06 | 3.20 0.7 |
| Type of failure | stick slip | adhesive/cohesive | stick slip adhesive stainless steel | mixed stick slip cohesive | mixed stick slip cohesive | stick slip | stick slip |
| 180° Peel, 24 h, in N/25 mm | 26.85 1.25 | 9 1.98 | 3.05 0.21 | 11.20 11.46 | 22.00 12.30 | 0.25 0.07 | 5.00 1.84 |
| Type of failure | cohesive | adhesive/cohesive | stick slip adhesive stainless steel | mixed stick slip cohesive | mixed stick slip cohesive | stick slip | stick slip |

TABLE 4-continued

|  | HV 252101 UN | 1A26 DERCOLYTE A115 20-70-30 | 1A26 DERCOLYTE A115 30-70-30 | 1A01 DERCOLYTE A115 20-70-30 | 1A01 DERCOLYTE A115 30-70-30 | 1A06 DERCOLYTE A115 20-70-30 | 1A06 DERCOLYTE A115 30-70-30 |
|---|---|---|---|---|---|---|---|
| Loop Tack in N/25 mm | 6.42 | 3 | 2.23 | 5.13 | 7.13 | 2.68 | 4.80 |
|  | 1.25 | 1.75 | 1.18 | 2.00 | 3.85 | 0.25 | 1.37 |
| Viscosity, T = 0, in mPa · s at 163° C. | 2100 | 1100 | 3100 | 887 | 3200 | 850 | 1500 |

TABLE 5

| Reference | Composition 1st block | % of 1st block | Composition 2nd block | % of 2nd block | Mw |
|---|---|---|---|---|---|
| 2A13 | BuA | 66 | S, AA | 34 (S/AA 98/2) | 206 530 |
| 2A25 | BuA | 76 | S, MAA | 24 (S/MAA 93/7) | 185 580 |

TABLE 6

|  | HV 252101 UN | 2A13 FORAL AX TOTM 20/(70/30) | 2A13 FORAL AX TOTM 30/(70/30) | 2A13 FORAL AX Catenex N956 20/(70/30) | 2A13 FORAL AX Catenex N956 30/(70/30) | 2A25 FORAL AX TOTM 20/(70/30) | 2A25 FORAL AX TOTM 30/(70/30) | 2A09 FORAL AX Catenex N956 0/(70/30) | 2A25 FORAL AX Catenex N956 30/(70/30) |
|---|---|---|---|---|---|---|---|---|---|
| Mean weight per unit area in g/m² | 25.15 | 26 | 25.4 | 25.4 | 25.1 | 25.16 | 25.64 | 25.28 | 26.55 |
| standard deviation | 1.34 | 0.9 | 1.8 | 1.6 | 1.9 | 1.83 | 1.11 | 1.53 | 0.89 |
| SAFT, stainless steel, in ° C. | 63 | 38 | 48 | 42 | 51 | 31 | 33 | 43 | 51 |
| standard deviation | 1.8 | 1.3 | 0.6 | 0.0 | 0.6 | 1.00 | 0.50 | 1.15 | 0.58 |
| Creep, stainless steel, in min | 10 000 | 14 | 152 | 214 | 833 | 4 | 15 | 91 | 943 |
| 180° Peel, 20 min, on stainless steel, in N/25 mm | 0.40 | 13.80 | 18.87 | 18.17 | 15.35 | 15.87 | 18.67 | 16.80 | 21.40 |
| standard deviation | 0.00 | 0.95 | 2.59 | 0.32 | 4.31 | 1.31 | 1.70 | 1.81 | 1.56 |
| Type of failure | stick slip | cohesive | cohesive | cohesive | stick slip cohesive | cohesive | cohesive | cohesive slightly stick slip | cohesive stick slip |
| 180° Peel, 24 h, on stainless steel, in N/25 mm | 26.85 | 4.00 | 14.65 | 18.70 | 14.50 | 14.65 | 19.5 | 17.9 | 24.6 |
| standard deviation | 1.25 | 0.14 | 6.15 | 0.14 | 0.00 | 0.35 | 1.41 | 2.26 | 0.28 |
| Type of failure | cohesive | adhesive stainless steel | cohesive adhesive stainless steel | cohesive | cohesive | cohesive | adhesive stick slip | cohesive slightly stick slip | cohesive |
| Loop Tack In N/25 mm | 6.42 | 24.73 | 23.93 | 34.10 | 13.58 | 31.23 | 30.88 | 29.90 | 17.38 |
| standard deviation | 1.25 | 7.57 | 6.00 | 7.92 | 3.86 | 4.04 | 3.74 | 12.29 | 6.55 |
| Viscosity at 163° C., T = 0 s, in mPa · s | 2100 | 400 | 750 | 623 | 874 | 1000 | 1000 | 698 | 1105 |

TABLE 7

| Reference | Composition 1st block | % of the 1st block | Composition 2nd block | % of the 2nd block | Mw |
|---|---|---|---|---|---|
| 1A01 | BuA | 70 | S | 30 | 219 800 |
| 2A08 | BuA, AA | 64 (BuA/AA 99/1) | S | 36 | 247 210 |
| 2A09 | BuA, AA | 59 (BuA/AA 99/1) | S | 41 | 216 390 |

TABLE 8

| | 1A01 FORAL AXE Catenex N956 20/(70/30) | 1A01 FORAL AX Catenex N956 30/(70/30) | 1A01 FORAL AX Primol 352 20/(70/30) | 1A01 FORAL AX Primol 352 30/(70/30) | 2A08 FORAL AX Catenex N956 20/(70/30) | 2A08 FORAL AX Catenex N956 30/(70/30) |
|---|---|---|---|---|---|---|
| Mean weight per unit area in g/m² | 23.99 | 24.2 | 24.18 | 24.2 | 26.44 | 25.45 |
| standard deviation | 1.41 | 1.15 | 1.35 | 1.15 | 1.12 | 1.09 |
| SAFT, stainless steel, in ° C. | 48 | 52 | 26 | 36 | 52 | 49 |
| standard deviation | 1.0 | 0.5 | 0.5 | 1.0 | 0.5 | 1.7 |
| Creep, stainless steel, in min | 613 | 1052 | 6 | 30 | 1740 | 672 |
| 180° Peel, 20 min, on stainless steel, in N/25 mm | 10.57 | 21.40 | 7.23 | 0.80 | 15.10 | 14.43 |
| standard deviation | 6.93 | 2.33 | 3.33 | 0.69 | 2.95 | 0.67 |
| Type of failure | cohesive/ stick slip | cohesive | cohesive | adhesive stainless steel | cohesive stick slip | mixed adhesive stainless steel stick slip |
| 180° Peel, 24 h, on stainless steel, in N/25 mm | 17.10 | 14.45 | 4.95 | 2.10 | 17.50 | 10.05 |
| standard deviation | 1.41 | 5.73 | 6.15 | 2.26 | 0.85 | 4.60 |
| Type of failure | adhesive stainless steel | cohesive/ stick slip | adhesive stainless steel | adhesive stainless steel | cohesive | adhesive stainless steel stick slip |
| Loop tack in N/25 mm | 28.93 | 32.38 | 20.62 | 15.57 | 38.53 | 20.85 |
| standard deviation | 6.51 | 3.28 | 2.21 | 0.59 | 1.76 | 8.06 |
| Viscosity at 163° C., T = 0 s, in mPa · s | 525 | 1150 | 7000 | 8150 | 3500 | 2350 |

TABLE 8-continued

|  | 2A08 FORAL AX Primol 352 20/(70/30) | 2A08 FORAL AX Primol 352 30/(70/30) | 2A09 FORAL AX Catenex N956 20/(70/30) | 2A09 FORAL AX Catenex N956 30/(70/30) | 2A09 FORAL AX Primol 352 20/(70/30) | 2A09 FORAL AX Primol 352 30/(70/30) |
|---|---|---|---|---|---|---|
| Mean weight per unit area in g/m² | 25.33 | 25.54 | 23.9 | 24.57 | 25.22 | 26.23 |
| standard deviation | 1.55 | 1.91 | 1.78 | 1.12 | 1.97 | 1.13 |
| SAFT, stainless steel, in °C. | 25 | 27 | 54 | 50 | 34 | 25 |
| standard deviation | 0.0 | 1.5 | 1.00 | 0.58 | 0.82 | 1.91 |
| Creep, stainless steel, in min | 11 | 17 | 892 | 884 | 39 | 84 |
| 180° Peel, 20 min, on stainless steel, in N/25 mm | 1.93 | 2.37 | 13.27 | 1.73* | 8.20 | 2.43 |
| standard deviation | 1.96 | 1.19 | 0.15 | 0.15 | 2.05 | 0.85 |
| Type of failure | adhesive stainless steel | adhesive stainless steel | cohesive stick slip | stick slip | cohesive | adhesive stainless steel |
| 180° Peel, 24 h, on stainless steel, in N/25 mm | 1.45 | 0.20 | 17.55 | 3.95 | 5.1 | 1.2 |
| standard deviation | 1.63 | 0.14 | 0.64 | 1.20 | 0.42 | 0.28 |
| Type of failure | cohesive adhesive stainless steel | cohesive | cohesive | stick slip | cohesive | cohesive |
| Loop tack in N/25 mm | 15.03 | 15.80 | 33.50 | 10.95 | 19.28 | 19.40 |
| standard deviation | 1.70 | 4.45 | 1.49 | 3.66 | 2.96 | 6.23 |
| Viscosity at 163° C., T = 0 s, in mPa·s | 2560 | 4500 | 613 | 2480 | 1760 | 8560 |

The invention claimed is:

1. An adhesive composition comprising
a) from 15 to 50 percent by weight of the total weight of the adhesive composition of a block copolymer corresponding to the following formula:

I—(B)$_{n*}$-(A)$_m$, in which n* is an integer greater than or equal to 1, m an integer less than or equal to n*, B a polymer block directly bonded to the core I via a covalent bond, obtained by the polymerization of a mixture of monomers (B$_0$) comprising:
from 92 to 98% by weight of at least one monomer (B$_1$) chosen from the group consisting of linear or branched C$_1$-C$_{12}$ alkyl acrylates,
from 2 to 8% by weight of at least one monomer (B$_2$) chosen from acids, and their salts, A is a polymer block directly bonded to the B block via a covalent bond, obtained by the polymerization of a mixture of monomers (A$_0$) comprising:
from 95 to 100% by weight of at least one monomer (A$_1$) chosen from the group consisting of methacrylic monomers, styrene monomers and their derivatives,
from 0 to 5% by weight of at least one monomer (A$_2$) chosen from acids and their derivatives, the core I being an organic group having n, greater than or equal to 1, carbon atoms to which are attached the B blocks via one of the valences of these carbon atoms, with core I corresponding to one of the following formulae:

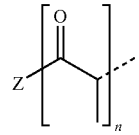
Ia

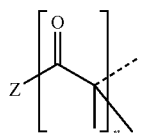
Ib

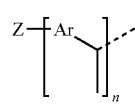
Ic in which Ar denotes a substituted aromatic group and Z is a polyfunctional organic or inorganic radical with a molar mass of greater than or equal to 14, Z is associated with n functional groups of acryl type in the formula Ia, with n functional groups of methacryl type in the formula Ib and with n functional groups of styryl type in Ic;
b) from 35 to 50 percent by weight of the total weight of the adhesive composition of at least one tackifying resin; and
c) from 10 to 30 percent by weight of the total weight of the adhesive composition of at least one plasticizer,
wherein the said polyfunctional organic radical is selected from the group of radicals consisting of: 1,2-ethanedioxy, 1,3-propanedioxy, 1,4-butanedioxy, 1,6-hexanedioxy, 1,3,5-tris(2-ethoxy)cyanuric acid, polyaminoamines, polyethyleneamines, 1,3,5-tris(2-ethylamino)cyanuric acid, polythioxy, phosphonate and polyphosphonate.

2. The adhesive composition according to claim 1, wherein $B_2$ is acrylic acid.

3. The adhesive composition according to claim 1, wherein $A_0$ comprises:
   from 95 to 98% by weight of monomers $A_1$ and
   from 2 to 5% by weight of monomers $A_2$.

4. The adhesive composition according to claim 1, wherein $A_2$ is methacrylic acid.

5. The adhesive composition according to claim 1, wherein the B block represents from 50 to 95% by weight of the total weight of the said copolymer.

6. The adhesive composition according to claim 1, wherein the B block has a Tg of less than 0° C.

7. The adhesive composition according to claim 1, wherein the B block has a weight-average mass of between 2000 and 300 000 g/mol, and a polydispersity index of between 1 and 3.

8. The adhesive composition according to claim 1, wherein the A block has a Tg of greater than ambient temperature.

9. Composition according to claim 1, wherein the plasticizer is chosen from trimellitate oils, or predominantly naphthenic oils.

10. Composition according to claim 1, wherein the tackifying resin is chosen from the group consisting of resins based on rosins, on rosin ester, on polyterpene, on hydroxylated polyester, on terpene styrene, on pentaerythritol terpene or on terpene phenol.

11. The adhesive composition of claim 1 comprising an adhesive tape or label.

12. The adhesive composition of claim 1 comprising at least one block copolymer corresponding to the following formula:

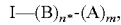

in which n* is an integer greater than or equal to 1, m an integer less than or equal to n*, B a polymer block directly bonded to the core I via a covalent bond, obtained by the polymerization of a mixture of monomers ($B_0$) comprising:
   from 92 to 98% by weight of at least one monomer ($B_1$) chosen from the group consisting of linear or branched $C_1$-$C_{12}$ alkyl acrylates,
   from 2 to 8% by weight of at least one monomer ($B_2$) chosen from acids and their derivatives, and their salts, A is a polymer block directly bonded to the B block via a covalent bond, obtained by the polymerization of a mixture of monomers ($A_0$) comprising:
   from 95 to –98% by weight of at least one monomer ($A_1$) chosen from the group consisting of methacrylic monomers, styrene monomers and their derivatives,
   from 2 to 5% by weight of at least one monomer ($A_2$) chosen from acids and their derivatives,
the core I being an organic group having n, greater than or equal to 1, carbon atoms to which are attached the B blocks via one of the valences of these carbon atoms, with core I corresponding to one of the following formulae:

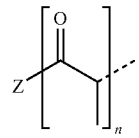

Ia

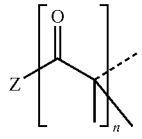

Ib

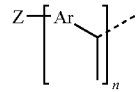

Ic in which Ar denotes a substituted aromatic group and Z is a polyfunctional organic or inorganic radical with a molar mass of greater than or equal to 14, Z is associated with a functional groups of acryl type in the formula Ia, with n functional groups of methacryl type in the formula Ib and with n functional groups of styryl type in Ic,
   wherein the said polyfunctional organic radical is selected from the group of radicals consisting of: 1,2-ethanedioxy, 1,3-propanedioxy, 1,4butanedioxy, 1,6-hexanedioxy, 1,3,5-tris(2-ethoxy)cyanuric acid, polyaminoamines, polyethyleneamines, 1,3,5-tris(2-ethylamino)cyanuric acid, polythioxy, phosphonate and polyphosphonate.

* * * * *